March 23, 1943.                F. R. CLARK ET AL                 2,314,441
                            WRAPPER SEALING MACHINE
                    Filed June 5, 1941              6 Sheets-Sheet 1
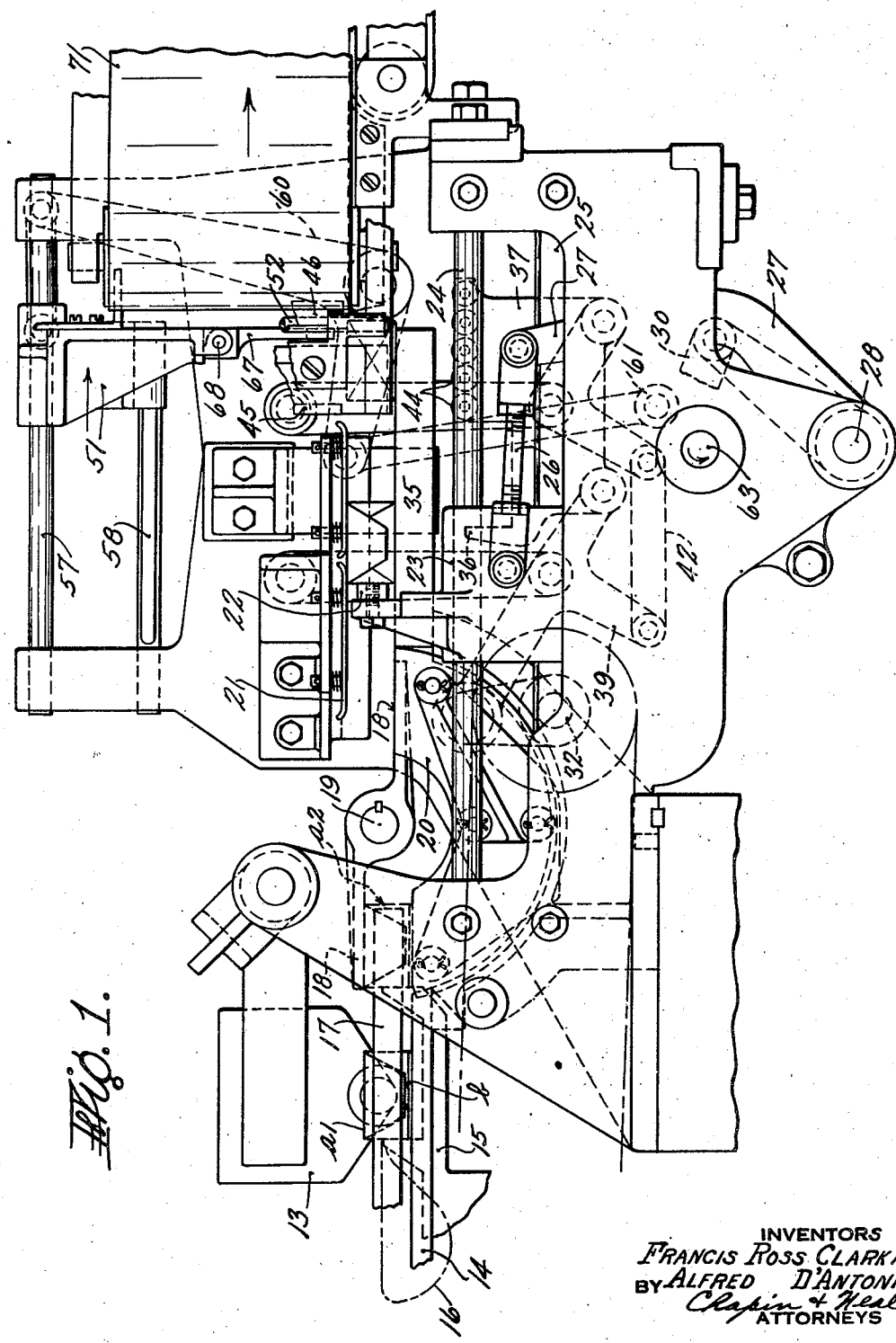
INVENTORS
FRANCIS ROSS CLARK AND
BY ALFRED D'ANTONIO
ATTORNEYS

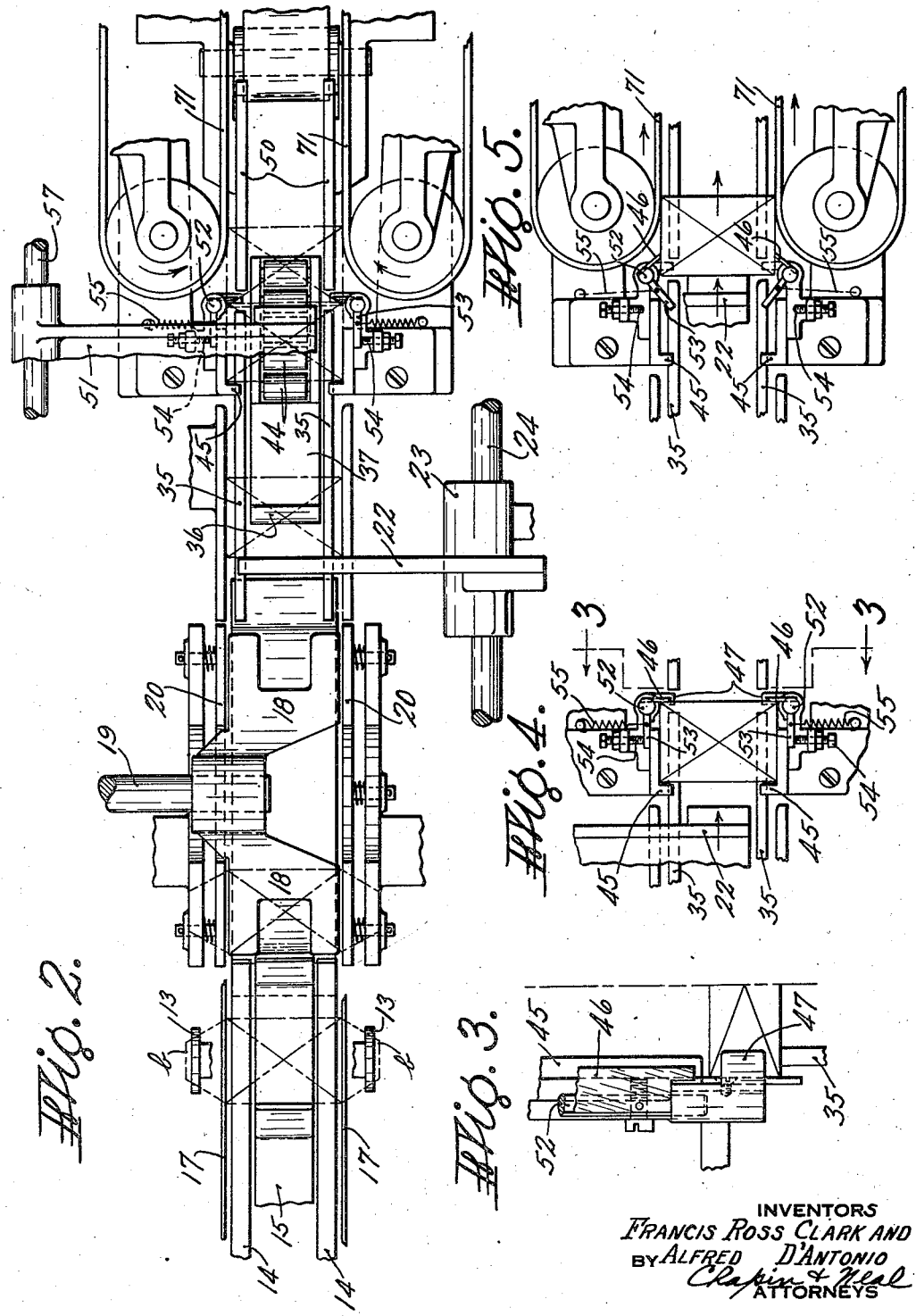

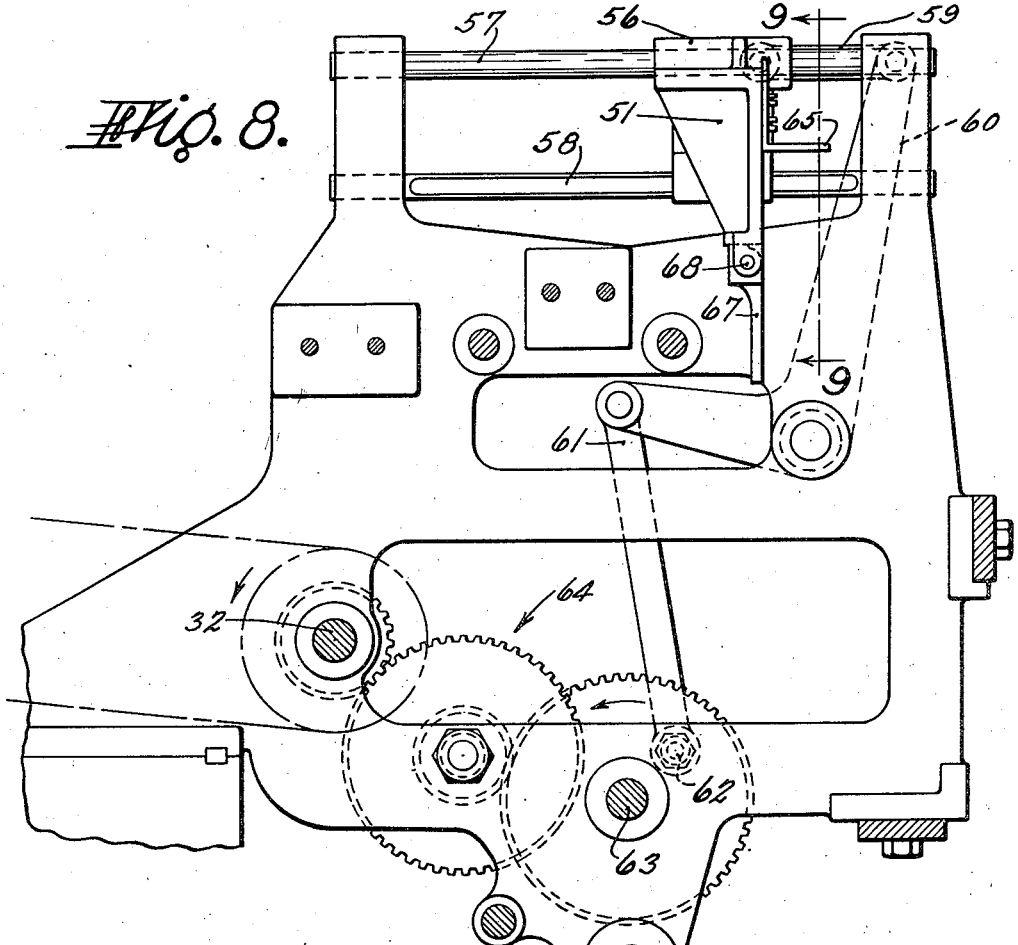

INVENTORS
FRANCIS ROSS CLARK AND
BY ALFRED D'ANTONIO
ATTORNEYS

Patented Mar. 23, 1943

2,314,441

UNITED STATES PATENT OFFICE 2,314,441

WRAPPER SEALING MACHINE

Francis Ross Clark, Leonia, N. J., and Alfred D'Antonio, Longmeadow, Mass., assignors to Package Machinery Company, Springfield, Mass., a corporation of Massachusetts Application June 5, 1941, Serial No. 396,704

7 Claims. (Cl. 93—2)

This invention relates to sealing mechanism intended particularly for use with wrapping machines. Whether the overlapped flaps of a package are held by adhesive, by the action of a solvent on a wrapper coating, or by the fusion of such a coating by heat, it is necessary to hold the flaps in place for a certain minimum time to permit the sealing material to become set. Where comparatively large articles are wrapped at high speeds the length of delivery channel necessary to keep the articles within it for this predetermined time becomes very great. It is the object of the present invention to provide a delivery channel construction in which the articles are formed into a stack which is passed down the channel as a unit, thus allowing the speed of travel down the channel to be cut in proportion to the number of articles in the stack, and giving a channel of given length a greatly increased capacity.

The manner in which this is done, and the preferred construction of the mechanism, will now be described in connection with the accompanying drawings, in which Fig. 1 is a side elevation of the delivery end of a wrapping machine embodying the invention;

Fig. 2 is a top plan of the mechanism shown in Fig. 1;

Fig. 3 is a section on line 3—3 of Fig. 4;

Fig. 4 is a fragmentary plan of the package stacking station;

Fig. 5 is a similar view showing a later stage of operation;

Fig. 8 is a detail of the mechanism operating the stack pusher;

Fig. 9 is a section on line 9—9 of Fig. 8; and

Figure 12:
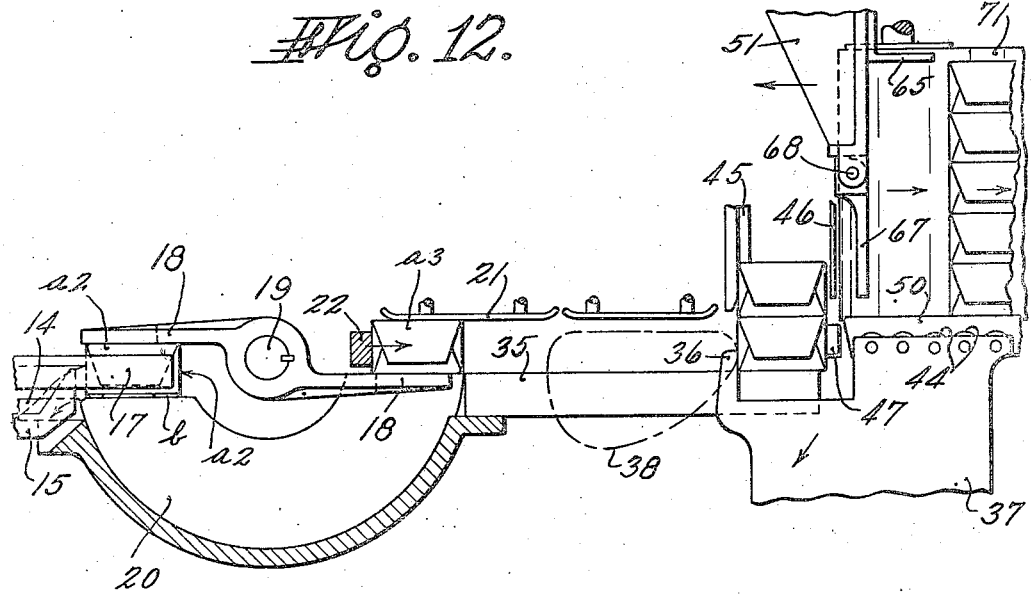
Figure 13:
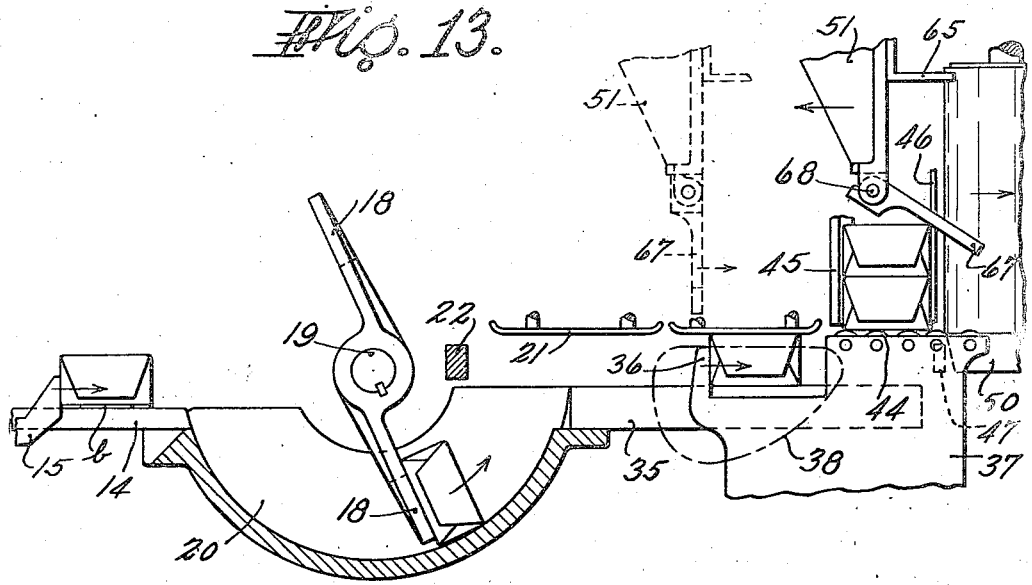

The stacking and discharge mechanism is shown as attached to a wrapping machine, only the discharge end of which is shown. The partially wrapped packages $a_1$ (subscripts being used to indicate successive article positions), are fed on rails 14 as by a parallel motion transporter 15 movable in a path 16 past a gluing device 13 which applies a daub of glue or solvent to the lower side flaps $b$, which are the only ones outstanding at that stage. The last finger of the transporter delivers the article $a_2$ between guide rails 17 and underneath one arm 18 of a rotating carrier, the shaft 19 of which may be driven intermittently by any suitable mechanism such for example as that shown in the Smith Patent 2,210,734, August 6, 1940. After the article has been thus positioned (Fig. 12) the carrier starts to turn, carrying the article from rails 17 between spring pressed plates 20 which fold down the flap $b$ and hold it during the semi-circular travel of the carrier.

Figure 6:
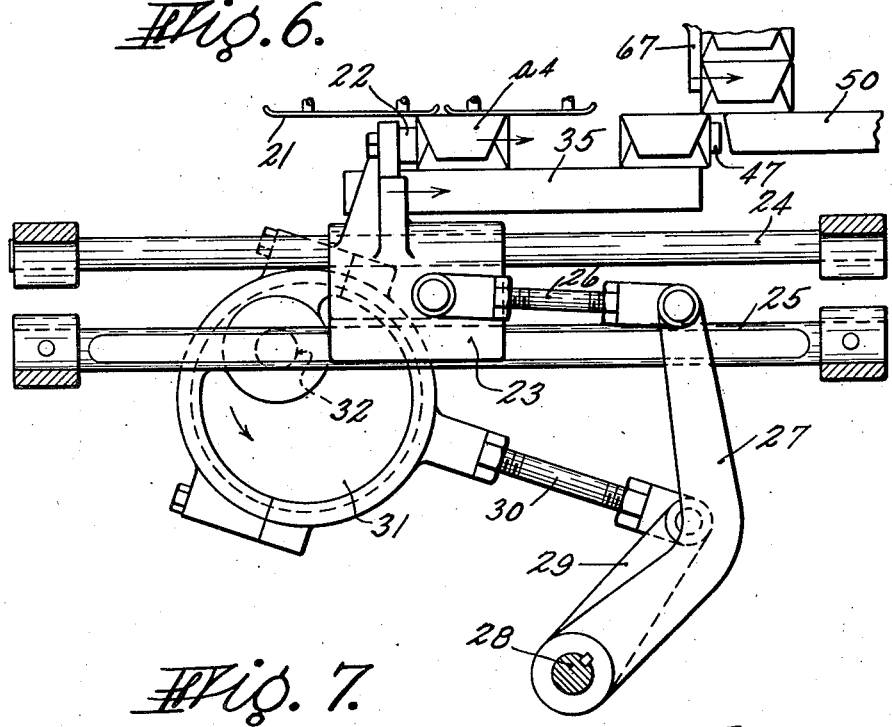
Fig. 6 is a detail of parts shown in Fig. 1.

The article $a_3$ ends this travel underneath a spring-pressed plate 21, beyond the plates 20, and in front of an ejector 22 mounted on a slide 23 movable on a rod 24 and steadied by a guide rail 25 (Fig. 6). A link 26 joins the slide with an arm 27 secured to a shaft 28, a second arm 29 on this shaft being coupled by a link 30 with an eccentric 31 carried by a shaft 32. The motion of the ejector 22 is simply rectilinear, moving rearwardly to a position adjacent shaft 19 during the period of rotation of the carrier and moving to eject the article while the carrier is stationary.

Figure 7:
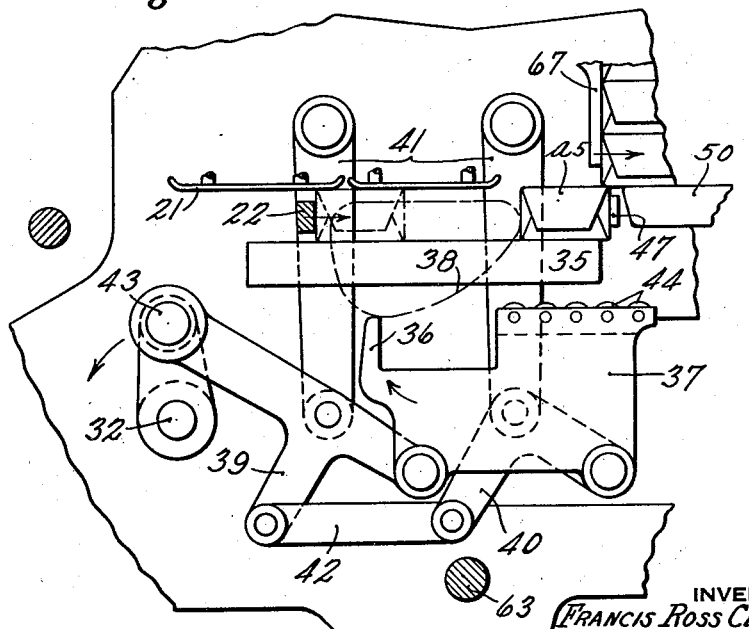
Fig. 7 is a detail of the mechanism operating the single package transporter.
Figure 10:
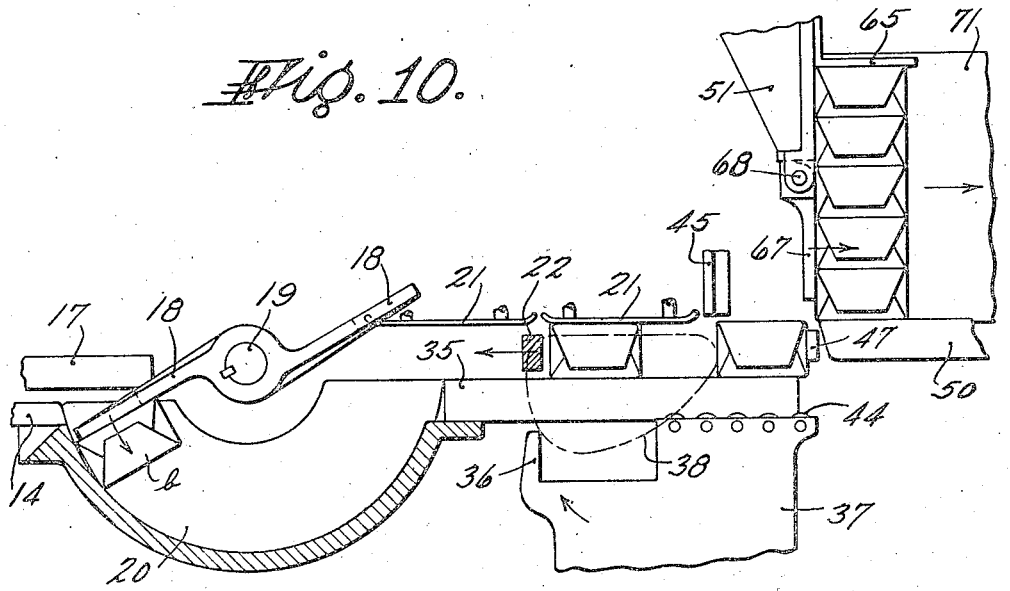
Figs. 10 to 13 are views showing the progressive formation and discharge of a stack.
Figure 11:
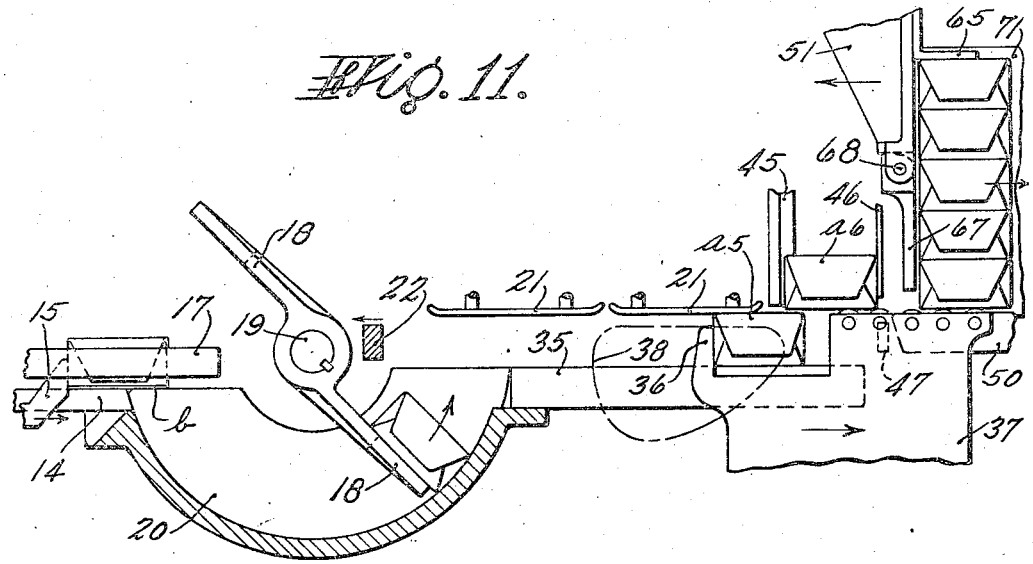

The article $a_4$ is positioned by the ejector 22 on rails 35 where it is next engaged by a finger 36 on a transporter 37. This transporter is given a parallel movement in a path 38 by mechanism shown in Fig. 7. Two bell cranks 39 and 40 are pivoted on swinging arms 41 and are connected by a link 42. The bell crank 39 has an extension by which it is connected to a crank 43 on shaft 32, by which the transporter will be carried through the path 38. Finger 36 carries the article to a position $a_5$ where it is engaged from below by rollers 44 mounted on the transporter and elevated between rear vertical guide rails 45 and a pair of spring held front rails 46. Fixed lower stops 47 on the same level as the ejector 22 hold the article against forward movement during the first part of the action of the rollers, which move in a curved path rather than vertically. As will be clear from Fig. 11 the article is raised into position $a_6$ by the rollers, and is maintained in that position first by the rollers as they move to the right in the horizontal portion of their endless path and then by the next article being shifted between positions $a_4$ and $a_5$ by the finger 36.

As each article is raised those above it will also be raised until finally there are, in the case shown, six articles in stack formation. The upper five articles are then pushed off onto a discharge platform 50 by a pusher 51, such action being permitted by the yielding of rails 46. For this purpose these rails are mounted on pivots 52 having arms 53 normally held against adjustable stops 54 by springs 55 (Fig. 4), but movable against the tendency of the springs (Fig. 5) to permit passage of the stack. The drive for the pusher 51 is shown in Fig. 8, in which it will be seen that the pusher is mounted on a slide 56 movable on a rail 57 and forked to embrace a guide rod 58. A link 59 connects the slide with the upper end of a bell crank 60 which is tied by a link 61 to a crank pin 62 on a shaft 63 driven as by gearing 64 from the shaft 32. Pusher 51 is provided with an angular top guide 65 for steadying the stack, adjustable as by a screw and slot connection 66. The lower part 67 of the pusher is hinged at 68 and is slotted at 69 to clear the support for the top plate 21.

The operation of the mechanism will now be briefly described. With the packages being forwarded singly and successively by the ejector 22 and the finger 36 they are received by the rollers 44 and stacked in the vertical chute formed by the rails 45, 46 until the stack has reached a height of six articles. The pusher 51 then engages the top five articles of the stack and moves them to the right (as viewed in the drawings) onto a delivery table 50 and between end belts 71 which hold the folded wrapper until the sealing medium has set. The stack pusher 51 moves at a lesser cyclic rate than the pushers which carry the articles individually, due to the reducing effect of the gear train 64, but by reason of the position of the crank pin 62 has its fastest travel at the time the stack is being shifted onto the table 50. A new stack starts to form before the pusher can return to inactive position, and to permit the return of the pusher its lower end is hinged at 68 to permit it to drag over the top article of the new stack. The relatively slow movement of the stacks between the belts permits a sufficient setting time to occur without an excessive length of the delivery table. The speed of the belts 71 is sufficiently low (being driven by any suitable mechanism) so that the stacks delivered to it by the pusher will be kept in closely spaced relation as compared with the spacing of the articles while moving individually so that the length of the delivery table is still further reduced.

I claim:

1. A sealing mechanism for wrapping machines which comprises means for delivering wrapped articles singly with adhesively sealed end folds, transporting mechanism having pushing and elevating members for accumulating a stack of articles piled one upon the other, opposed holding members for the end folds of the article, and means for delivering stacks from the stacking mechanism to the holding members.

2. A sealing mechanism for wrapping machines which comprises means for delivering wrapped articles singly with adhesively sealed end folds, transporting mechanism having pushing and elevating members for accumulating a stack of articles piled one upon the other, opposed moving belts for holding the end folds of the article, a delivery table between the belts, and means for delivering stacks from the stacking mechanism onto the delivery table into position to be engaged between said belts.

3. A sealing mechanism for wrapping machines which comprises means for delivering wrapped articles singly with adhesively sealed end folds, stacking mechanism for accumulating a group of articles piled one upon the other, opposed holding members for the end folds of the articles, and a reciprocating pusher having a tilting stack-contacting face and movable to deliver a stack from the stacking mechanism to the holding members and to return over the next stack being formed.

4. A sealing mechanism for wrapping machines which comprises means for delivering wrapped articles singly with adhesively sealed end folds, stacking mechanism for accumulating a group of articles piled one upon the other, opposed moving belts for holding the end folds of the article, a delivery table between the belts, and a reciprocating pusher having a tilting stack-contacting face and movable to deliver a stack from the stacking mechanism onto the delivery table and between the belts and to return over the next stack being formed.

5. A sealing mechanism for wrapping machines which comprises a guideway for single articles, means for feeding individually along the guideway a succession of wrapped articles with adhesively secured end folds, stack receiving guides above said guideway, means having pushing and elevating members for moving articles from the guideway between the guides to form a stack, opposed holding members for the end folds of the articles, and means for delivering a stack of articles from between the guides to a position for engagement with said holding members.

6. A sealing mechanism for wrapping machines which comprises a guideway for single articles, means for feeding individually along the guideway a succession of wrapped articles with adhesively secured end folds, stack receiving guides above said guideway, a roller-bearing platen, means moving said platen in an endless path along and back under said guideway to elevate an article between the guides and to hold it so elevated until a succeeding article has been fed below it by said means, a delivery table, opposed moving belts for holding the end folds of the article, and a reciprocating pusher movable to shift a stack from between the guides onto the delivery table and between the belts.

7. A sealing mechanism for wrapping machines which comprises a guideway for single articles, means for feeding individually along the guideway a succession of wrapped articles with adhesively secured end folds, stack receiving guides above said guideway, a roller-bearing platen, means moving said platen in an endless path along and back under said guideway to elevate an article between the guides and to hold it so elevated until a succeeding article has been fed below it by said means, a delivery table, opposed moving belts for holding the end folds of the articles, and a reciprocating pusher having its lower portion hinged to swing forwardly only, said pusher being movable to shift a stack from between the guides onto the delivery table and between the belts and to return with its hinged portion dragging over the next stack being formed.

FRANCIS ROSS CLARK.
ALFRED D'ANTONIO.